United States Patent
Pitcher

(10) Patent No.: US 11,213,768 B2
(45) Date of Patent: Jan. 4, 2022

(54) AUTOMATED SAND SEPARATOR DISCHARGE SYSTEM

(71) Applicant: Batfer Investment S.A., Montevideo (UY)

(72) Inventor: Jason Pitcher, The Woodlands, TX (US)

(*) Notice: Subject to any disclaimer, the term of this patent is extended or adjusted under 35 U.S.C. 154(b) by 0 days.

(21) Appl. No.: 16/984,976

(22) Filed: Aug. 4, 2020

(65) Prior Publication Data
US 2021/0299594 A1    Sep. 30, 2021

Related U.S. Application Data

(60) Provisional application No. 63/002,040, filed on Mar. 30, 2020.

(51) Int. Cl.
| | | |
|---|---|---|
| *B01D 21/24* | (2006.01) | |
| *E21B 43/34* | (2006.01) | |
| *B01D 21/34* | (2006.01) | |
| *B01D 21/30* | (2006.01) | |

(52) U.S. Cl.
CPC ......... *B01D 21/245* (2013.01); *B01D 21/302* (2013.01); *B01D 21/34* (2013.01); *E21B 43/35* (2020.05)

(58) Field of Classification Search
None
See application file for complete search history.

(56) References Cited

U.S. PATENT DOCUMENTS

| | | |
|---|---|---|
| 6,790,367 B2 | 9/2004 | Schmigel et al. |
| 9,803,459 B1 * | 10/2017 | Leal .................. B01D 21/2405 |
| 2014/0345727 A1 | 11/2014 | Gilmore et al. |
| 2019/0118118 A1 * | 4/2019 | Sehsah .............. B01D 21/0009 |
| 2021/0077923 A1 | 3/2021 | Carlson et al. |
| 2021/0252431 A1 | 8/2021 | Malone et al. |

* cited by examiner

*Primary Examiner* — Richard C Gurtowski
(74) *Attorney, Agent, or Firm* — Bushman Werner, P.C.

(57) ABSTRACT

A system for automatically discharging sand from a sand separator. The system includes a first and second valves and a choke valve disposed in a discharge line from a sand separator. A pressure transducer measures pressure in the line between the first and second valves. A control panel operates the valves to initiate and terminate the discharge sequence. An emergency shutdown valve is positioned upstream of the sand separator and is operative to shut down the system if the pressure reading by the transducer exceeds a predetermined amount.

14 Claims, 1 Drawing Sheet

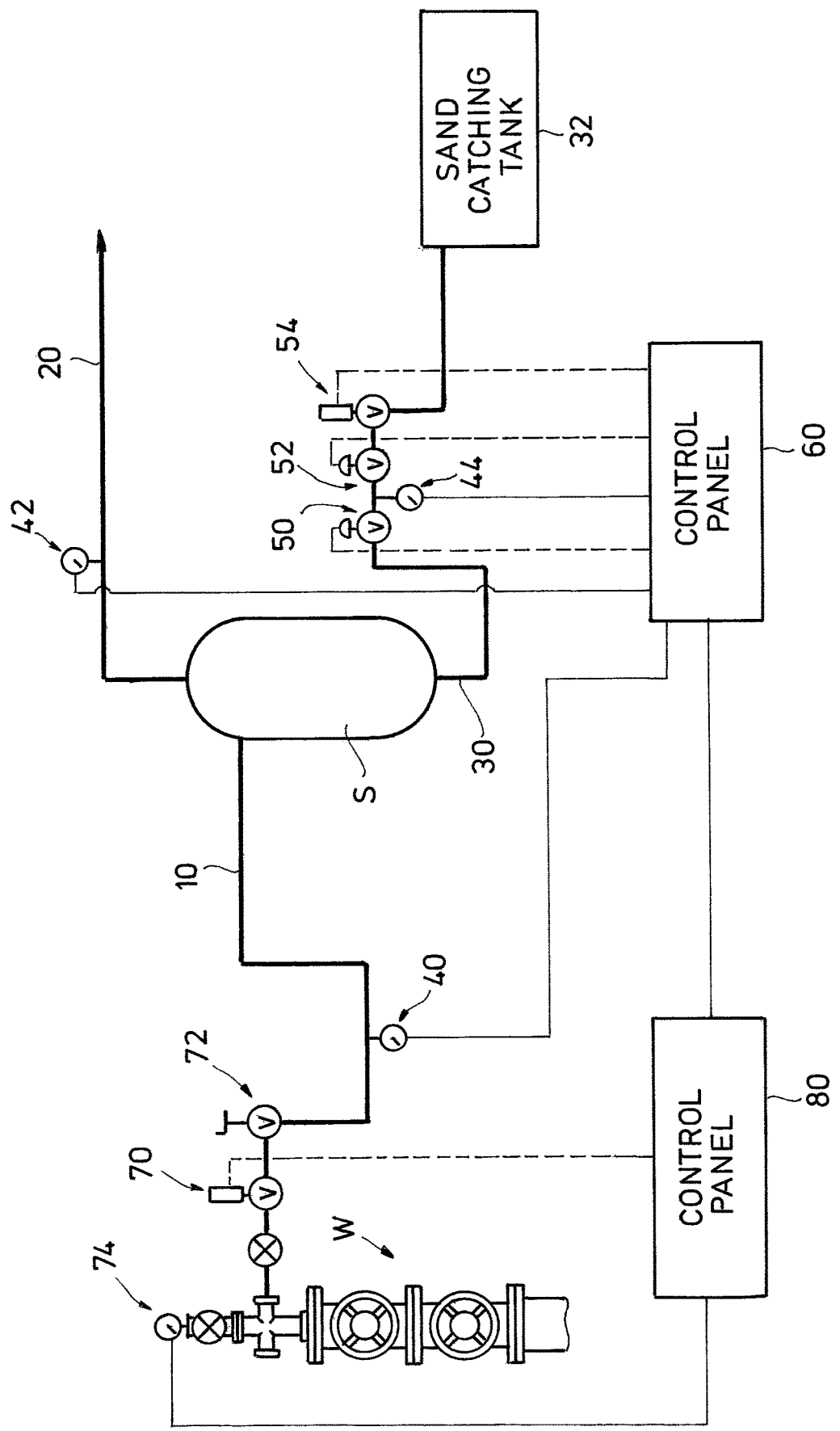

AUTOMATED SAND SEPARATOR DISCHARGE SYSTEM

CROSS REFERENCE TO RELATED APPLICATION

This application claims priority to U.S. Application No. 63/002,040 filed on Mar. 30, 2020, the disclosure of which is incorporated herein by reference for all purposes.

FIELD OF THE INVENTION

The present invention relates to an automated discharge system for a sand separator positioned downstream of an oil or gas wellhead.

BACKGROUND OF THE INVENTION

Sand separators (also known as sand traps and sand catches) are often the first piece of equipment downstream of an oil or gas wellhead. A sand separator captures sand and sediment from the production stream to protect further downstream equipment from plugging and erosion. In a typical sand separator, the sand and sediment are separated using deflectors, impingement plates or baffles, and gravity. The plates/baffles keep sand and sediment separated at the bottom of the vessel, while allowing gas and liquids to flow at the top. The liquids and gas are carried through an upper outlet line for further downstream processing and the sand/sediment is periodically discharged from the bottom of the separator.

SUMMARY OF THE INVENTION

In one aspect, the present invention relates to an automated discharge system for a sand separator.

In another aspect, the present invention relates to a sand separator discharge system which can be triggered by a remote command, in response to a sand level sensor, or on an automated schedule.

In yet another aspect, the present invention relates to a sand separator discharge system in which the integrity of the valves can be automatically verified and, if valve integrity has been compromised, shut the system down.

These and further features and advantages of the present invention will become apparent from the following detailed description, wherein reference is made to the FIGURES in the accompanying drawings.

BRIEF DESCRIPTION OF THE DRAWINGS

FIG. 1 depicts one embodiment of the system of the present invention.

DETAILED DESCRIPTION OF PREFERRED EMBODIMENTS

As used herein the term "sand" refers to sand, sediment, or other solid particulates which are undesirable in a stream produced from an oil or gas wellhead. It will thus be understood that the term "sand" is not limited to actual sand only.

FIG. 1 depicts one embodiment of the system of the present invention. The system comprises a sand separator S connected to a wellhead W by line 10. Sand separator S can be of any type well known to those skilled in the art. As with most typical sand separator systems, a stream from wellhead W, enters separator S wherein the sand is separated from the stream. The liquid and gas portion of the stream leaves separator S overhead via line 20 for further processing. The sand is removed from the bottom of separator S via line 30 and sent to a sand catching tank 32.

Transducers 40, 42, and 44 measure pressure in lines 10, 20, and 30, respectively. The purpose of transducers 40, 42, and 44 will be explained more fully later.

Valves 50 and 52 are positioned on either side of transducer 44 in line 30. Choke valve 54 is downstream of valve 52 but upstream of sand catching tank 32. Choke valve 54 is designed to be either fully open or fully closed and is the primary wear element of the system of the present invention. It will be appreciated that valves 50 and 52 can be of any hydraulically or pneumatically actuated type. Such valves can include, but are not limited to, plug valves, ball valves, gate valves, etc. In a preferred embodiment, valves 50 and 52 are plug valves. Choke valve 54 can also be of any type provided it is a choke valve. In a preferred embodiment, choke valve 54 is a hydraulically actuated, spring return choke valve, which fails open.

Control panel 60 receives data from transducers 40, 42, and 44 and thus monitors inlet pressure of sand separator S via transducer 40, outlet pressure via transducer 42, and the pressure between valves 50 and 52 via transducer 44. It is critical to ensure pressure integrity is maintained in line 30. This is achieved by monitoring the line between valves 50 and 52.

Control panel 60 is operatively connected to valves 50 and 52, and to choke valve 54. In a preferred embodiment, control panel 60 is an electric over hydraulic control panel.

A sand discharge sequence using one embodiment of the system of the present invention proceeds as shown below. In this embodiment all the valves all being controlled by control panel 60.

Sand Discharge Sequence
  prior to discharging sand from separator S, valves 50, 52, and 54 are all closed
  check that the pressure in transducer 44 is zero
  open valve 50
  check the pressure reading of transducer 44 which indicates the pressure in the separator
  open valve 52
  open choke valve 54 for a predetermined amount of time X
  close choke valve 54
  close valve 50
  check the pressure reading of transducer 44
    if the pressure reading is zero, close valve 52
    if the pressure reading is not zero, open choke valve 54 again
      when the pressure reading of transducer 44 reaches zero, close valve 52
    close choke valve 54

The predetermined amount of time X for which choke valve 54 is open will be determined by the operator or other personnel, and will be based on the particular sand separator to allow sufficient time to sufficiently discharge the sand separator S into the sand catching tank 32. It is generally desirable to leave some amount of sand in the bottom of sand separator S to ensure the liquids in sand separator S are not unintentionally discharged through line 30 as well.

The system of the present invention can be programed to initiate the discharge sequence in response to a timer (e.g., discharge every 240 minutes), a clock (e.g., discharge at 17:00 hours every day), or a sand level sensor operatively connected to sand separator S. The discharge sequence can also be initiated through a manual override.

Upstream of the sand separator S is a wing section comprising an emergency shutdown (ESD) valve 70 and a choke 72. In a preferred embodiment ESD valve 70 is a hydraulically actuated valve. Control panel 80 is connected to ESD valve 70 and allows for remote control of the well and provides a safety interlock for sand separator S. Transducer 74 is connected to wellhead W and sends signals to control panel 80. In the event that transducer 74 detects pressure above a certain threshold in wellhead W, control panel 80 will activate ESD valve 70 to shut down the system. Control panels 60 and 80 are also in communication with one another. If a differential pressure which exceeds a predetermined limit is detected between the inlet line 10 and outlet line 20. Control panel 60 will send a shutdown signal to control panel 80 which will activate ESD valve 70 to shut down the system.

Further, if valve 50 is closed and the pressure reading by transducer 44 is not zero after evacuating to atmosphere and closing valve 52, this indicates valve 50 has lost seal integrity and the system is shut down by ESD valve 70 to prevent failure of valve 52 as well.

While FIG. 1 depicts two separate control panels, 60 and 80, it will be understood that this is only one possible configuration and that control of the system of the present invention could be handled by a single control panel, or more than two control panels.

In addition to automatically discharging the sand from sand separator S, the present invention can automatically verify the integrity of the automated valves 50 and 52. The present invention employs two automated valves 50 and 52 downstream of the sand separator S with pressure transducer 44 between. To verify integrity of valve 52, the system traps pressure between the valves 50 and 52 and opens the choke to atmospheric pressure. The system monitors the pressure between the valves and if it decreases, it indicates that valve 52 has a compromised seal, and the system activates ESD valve 70 upstream of the sand separator to prevent the uncontrolled release of hydrocarbons through discharge line 30. The system tests the integrity of valve 50 by venting the space between the valves to atmosphere, then sealing the inter-valve space. The pressure is monitored with transducer 44 for an increase in pressure. If the pressure increases above atmospheric pressure, the seal integrity of valve 50 is compromised and again the system shuts down valve 70 and thus the feed to separator S. It will be understood by those skilled in the art that the integrity of the choke valve 54 is not verified because choke valve 54 is designed to wear. The system of the present invention can be programmed to automatically run valve integrity checks after a desired number of sand discharge sequences or after a specified amount of time. The valve integrity check can also be initiated by an operator at any time between the programmed integrity checks.

The system of the present invention provides advantages over the prior art. For example, the system of US 2014/0345727, incorporated herein by reference for all purposes, uses a single automated valve downstream of the sand trap, and measures the pressure of the lines upstream and downstream of the sand trap. If the pressures are outside the appropriate ranges, an alarm is triggered. However, the exact nature of what triggered the alarm cannot be determined. Additionally, the system of US 2014/0345727 and others which only use one valve downstream of the separator cannot automatically verify the integrity of the valve.

The system of the present invention thus automates the sand discharge system, reduces maintenance costs by verifying seal integrity, and improves safety by performing the processes automatically and by automatically shutting the system down when needed.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. An automated sand separator discharge system, comprising:
  a sand separator disposed downstream of a wellhead;
  an inlet conduit for transporting a process stream from said wellhead to said sand separator;
  a fluid outlet conduit for transporting a liquid and gas stream from said sand separator to further downstream processing;
  a sand discharge conduit for removing sand from said sand separator;
  first and second valves disposed along said sand discharge conduit;
  a choke valve positioned along said sand discharge conduit downstream of said first and second valves;
  a first transducer connected to the sand discharge conduit between said first and second valves and operative to measure pressure in the portion of said sand discharge conduit which is between said first and second valves and produce a pressure reading indicating the measured pressure;
  a control panel operatively connected to said first and second valves, said choke valve, and said first transducer, said control panel being programmed to initiate and terminate the discharge of sand from said sand separator, said control panel also being programmed to periodically perform individual seal integrity checks of each of said first and second valves to determine if said first and second valves are sealing completely when closed.

2. The system of claim 1, further comprising:
  a second transducer operative to measure pressure in said inlet conduit upstream of said sand separator and produce a pressure reading indicating the measured pressure, said second transducer being operatively connected to said control panel.

3. The system of claim 2, further comprising:
  a third transducer operative to measure pressure in said fluid outlet conduit downstream of said sand separator and produce a pressure reading indicating the measured pressure, said third transducer being operatively connected to said control panel.

4. The system of claim 1, wherein said control panel initiates said discharge of sand from said sand separator in response to a signal from one of a timer, a clock, or a sand level sensor.

5. The system of claim 1, further comprising:
  an emergency shutdown valve;
  said control panel operative to trigger said emergency shutdown valve if pressure reading of said first transducer is outside of predetermined specifications.

6. A method of discharging sand from a sand separator, comprising:
   providing a sand separator discharge system, comprising:
   a sand separator disposed downstream of a wellhead;
   an inlet conduit for transporting a process stream from said wellhead to said sand separator;
   a fluid outlet conduit for transporting a liquid and gas stream from said sand separator to further downstream processing;
   a sand discharge conduit for removing sand from said sand separator;
   first and second valves disposed along said sand discharge conduit;
   a choke valve positioned along said sand discharge conduit downstream of said first and second valves;
   a first transducer connected to the sand discharge conduit between said first and second valves and operative to measure pressure in the portion of said sand discharge conduit which is between said first and second valves and produce a pressure reading indicating the measured pressure;
   a control panel operatively connected to said first and second valves, said choke valve, and said first transducer, whereby said control panel is operative to initiate the discharge of sand from said sand separator;
   through the use of said control panel, initiating discharge of sand from said sand separator and performing the following steps:
   open said first valve;
   open said second valve;
   open said choke valve;
   through the use of said control panel, terminating discharge of sand from said sand separator and performing the following steps:
   close said choke valve;
   close said first valve;
   check the pressure reading of said first transducer;
      if the pressure reading is zero, close said second valve
      if the pressure reading is not zero, open said choke valve again
      when the pressure reading of said first transducer reaches zero, close said second valve and close said choke valve again.

7. The method of claim 6, further comprising:
   through the use of said control panel initiating a seal integrity check of said first and second valves, comprising:
      verifying seal integrity of said first valve by venting the portion of said sand discharge conduit between said first and second valves to atmosphere, then sealing said portion and monitoring the pressure reading of said first transducer for any increase in pressure;
      verifying seal integrity of said second valve by pressurizing the portion of said sand discharge conduit between said first and second valves, then opening said choke valve to atmospheric pressure, and monitoring the pressure reading of said first transducer for any decrease in pressure.

8. The method of claim 7, further comprising:
providing an emergency shutdown valve operatively connected to said control panel, whereby if said pressure reading increases while verifying seal integrity of said first valve or if said pressure reading decreases while verifying seal integrity of said second valve, said control panel activates said emergency shutdown valve.

9. The system of claim 1, wherein said control panel is programmed to verify seal integrity of said first valve by venting the portion of said sand discharge conduit between said first and second valves to atmosphere, then sealing said portion and monitoring the pressure reading of said first transducer for any increase in pressure; and
   wherein said control panel is programmed to verify seal integrity of said second valve by pressurizing the portion of said sand discharge conduit between said first and second valves, then opening said choke valve to atmospheric pressure, and monitoring the pressure reading of said first transducer for any decrease in pressure.

10. The system of claim 1, wherein said control panel is programmed to perform said seal integrity checks after a specified number of sand discharge sequences or after a specified amount of time.

11. The system of claim 3, further comprising:
   an emergency shutdown valve;
   said control panel operative to trigger said emergency shutdown valve if the difference between said pressure readings of said second and third transducers is outside of predetermined specifications.

12. The system of claim 1, further comprising:
   a fourth transducer connected to said wellhead, operative to measure pressure from said wellhead and produce a pressure reading indicating the measured pressure;
   an emergency shutdown valve;
   said control panel operative to trigger said emergency shutdown valve if said pressure reading of said fourth transducer is outside of predetermined specifications.

13. The system of claim 1, further comprising:
   an emergency shutdown valve;
   a second control panel in communication with said control panel, said second control panel operative to receive a signal from said control panel and trigger said emergency shutdown valve if pressure reading of said first transducer is outside of predetermined specifications.

14. The method of claim 6, wherein the discharge of sand is terminated after a predetermined period of time.

* * * * *